United States Patent
Taoka (10) Patent No.: US 8,379,093 B2
(45) Date of Patent: Feb. 19, 2013

(54) RECORDING AND REPRODUCTION APPARATUS AND METHODS, AND A RECORDING MEDIUM STORING A COMPUTER PROGRAM FOR EXECUTING THE METHODS

(75) Inventor: Mineki Taoka, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 806 days.

(21) Appl. No.: 12/329,801

(22) Filed: Dec. 8, 2008

(65) Prior Publication Data

US 2009/0153677 A1 Jun. 18, 2009

(30) Foreign Application Priority Data

Dec. 18, 2007 (JP) .................................. 2007-326261

(51) Int. Cl.
*H04N 5/228* (2006.01)
*H04N 5/232* (2006.01)
*G03B 13/00* (2006.01)

(52) U.S. Cl. ...................... 348/208.1; 348/154; 348/155; 348/208.4; 348/352

(58) Field of Classification Search .. 348/208.1–208.99, 348/231.2, 154, 155, 208.4; 396/53, 52; 382/254, 232
See application file for complete search history.

(56) References Cited

U.S. PATENT DOCUMENTS

| | | | |
|---|---|---|---|
| 2006/0109353 A1 | 5/2006 | Hayashi | |
| 2006/0153539 A1* | 7/2006 | Kaku | 386/112 |
| 2006/0170784 A1* | 8/2006 | Clarke et al. | 348/208.99 |
| 2008/0136931 A1* | 6/2008 | Hatanaka et al. | 348/222.1 |
| 2009/0033750 A1* | 2/2009 | Batur | 348/208.1 |

FOREIGN PATENT DOCUMENTS

| | | | |
|---|---|---|---|
| JP | 2006-033291 A | | 2/2006 |
| JP | 2006-157143 A | | 6/2006 |
| JP | 2006-173854 A | | 6/2006 |
| JP | 2006173854 | * | 6/2006 |
| JP | 2006-319541 A | | 11/2006 |

OTHER PUBLICATIONS

Office Action established for JP 2007-326261 (Sep. 18, 2012).

* cited by examiner

*Primary Examiner* — Nhan T Tran
*Assistant Examiner* — Stephen Coleman
(74) *Attorney, Agent, or Firm* — Drinker Biddle & Reath LLP (57) ABSTRACT

Apparatuses and methods for recording and reproducing RAW image data to more precisely correct for hand tremble in response to an electronic hand tremble correction when an image is recorded. The recording apparatus includes an image developing processor performing an image developing process on raw data sequentially output from an image sensor in frames and generating completely developed image data in frames, an electronic hand tremble correction unit performing an electronic hand tremble correction process on the completely developed image data and generating completely electronic hand tremble correction processed image data, a moving quantity data obtaining unit obtaining data of moving quantity in frames used for the electronic hand tremble correction process performed by the electronic hand tremble correction unit, and a storage medium recorder sequentially recording in frames the RAW data, the completely developed image data, and the data of moving quantity to a storage medium per frame.

18 Claims, 4 Drawing Sheets

RECORDING AND REPRODUCTION APPARATUS AND METHODS, AND A RECORDING MEDIUM STORING A COMPUTER PROGRAM FOR EXECUTING THE METHODS

CROSS-REFERENCE TO RELATED PATENT APPLICATION

This application claims the benefits of Japanese Patent Application No. 2007-326261, filed on Dec. 18, 2007, in the Japanese Intellectual Property Office, the entire content of which is incorporated herein by reference.

BACKGROUND OF THE INVENTION

1. Field of the Invention

The present invention relates to a recording apparatus, such as a digital camcorder, a camera, etc., a reproduction apparatus, recording and reproduction methods, and a recording medium storing a computer program for executing the methods. More particularly, the present invention relates to a recording apparatus for more precisely correcting a hand tremble in response to an electronic hand tremble correction when an image is recorded, a reproduction apparatus, recording and reproduction methods, and a recording medium storing a computer program for executing the methods.

2. Description of the Related Art

Generally, an image capturing device capable of recording motion pictures, such as a video camera, performs predetermined image processing (predetermined image developing processing) on signals output from each of pixels of an image sensor, such as a charge-coupled device (CCD), performs compression in a format, such as the motion picture experts group (MPEG)-2, the motion joint photographic experts group (JPEG), etc., and records image data to a storage medium, such as a flash memory, a hard disk drive (HDD), or a digital versatile disc (DVD).

Image processing includes white balance control, exposure control, etc. Also, when electronic hand tremble corrected images are recorded, an extracting location of data is determined so as to extract data from part of an image sensor. For example, Japanese Patent Publication No. 2006-33291 discloses a technique of automatically trimming raw image data in view of a subject by extracting the subject when an image is photographed. Japanese Patent Publication No. 2006-173854 discloses a technique of automatically trimming raw image data in view of a subject when an image is photographed, developing the trimmed data, and compressing the developed data.

Generally, as compression is performed after image processing, quality of images recorded and reproduced decreases as compared to that of images prior to compression. Therefore, certain image capturing devices, such as digital cameras, record signals output from image sensors in the raw format without compression. However, data quantity to be processed increases when motion pictures are recorded in the raw format in an image capturing device, such as a camcorder. Thus, it is common to preserve and use compressed images for operations, such as image signal processing, or reproduction in an image capturing device.

When electronic hand tremble corrected images are recorded, an extracting location of data is determined so as to extract data from part of an image sensor based on the output of an accelerometer. However, since the accuracy of the determination process depends on a limited operation circuit, such as a CPU included in image capturing devices, the capabilities of device may be limited, resulting in no appropriate correction to the hand tremble effect. When motion pictures are recorded, since information necessary for the electronic hand tremble correction involves time variations, it is impossible to be completely consistent with the temporal relations between the accelerometer and photographed images in view of the operation circuit of image capturing devices.

SUMMARY OF THE INVENTION

The present invention provides apparatuses and methods for recording and reproducing raw image data so as to more precisely carry out a hand tremble correction in response to an electronic hand tremble correction when an image is recorded, and a recording medium storing a program for implementing the methods.

Accordingly, an embodiment of the present invention provides a recording apparatus comprising an image developing processor for performing an image developing process on raw data sequentially output from an image sensor in frames and generating completely developed image data in frames, an electronic hand tremble correction unit for performing an electronic hand tremble correction process on the completely developed image data and generating completely electronic hand tremble correction processed image data, a moving quantity data obtaining unit for obtaining data of moving quantity in frames used for the electronic hand tremble correction process performed by the electronic hand tremble correction unit, and a storage medium recorder for sequentially recording the raw data in frames, the completely developed image data in frames, and the data of moving quantity in frames to a storage medium per frame.

Another embodiment of the present invention provides a reproduction apparatus comprising a data reader for reading at least one of each of raw data in frames, each of completely developed image data, and each of data of moving quantity, from a storage medium having sequentially per frame recorded thereon the raw data in frames, with the completely developed image data in frames obtained by performing an image developing process on the RAW data, and the data of moving quantity in frames used to generate completely electronic hand tremble correction processed image data obtained by performing an electronic hand tremble correction process on the completely developed image data. The apparatus further comprises an image processor for performing an image process partially extracting a frame of corresponding raw data according to the read data of moving quantity when reproducing sequentially the raw data in frames.

A further embodiment of the present invention provides a recording method comprising performing an image developing process on RAW data sequentially output from an image sensor in frames and generating completely developed image data in frames, performing an electronic hand tremble correction process on the completely developed image data and generating completely electronic hand tremble correction processed image data, obtaining data of moving quantity in frames used to perform the electronic hand tremble correction process, and sequentially recording the RAW data in frames, the completely developed image data in frames, and the data of moving quantity in frames to a storage medium per frame.

Another embodiment of the present invention provides a reproduction method comprising reading at least one of each of raw data in frames, each of completely developed image data, and each of data of moving quantity, from a storage medium having sequentially per frame recorded thereon the raw data in frames, with the completely developed image data in frames being obtained by performing an image developing process on the RAW data, and the data of moving quantity in frames used to generate completely electronic hand tremble correction processed image data being obtained by performing an electronic hand tremble correction process on the completely developed image data. The method further comprises performing an image process partially extracting a frame of corresponding RAW data according to the read data of moving quantity when reproducing sequentially the RAW data in frames.

A further embodiment of the present invention provides a storage medium having recorded thereon a computer program for executing a method. The method comprises performing an image developing process on RAW data sequentially output from an image sensor in frames and generating completely developed image data in frames, performing an electronic hand tremble correction process on the completely developed image data and generating completely electronic hand tremble correction processed image data, obtaining data of moving quantity in frames used to perform the electronic hand tremble correction process, and sequentially recording the RAW data in frames, the completely developed image data in frames, and the data of moving quantity in frames to a storage medium per frame.

Another embodiment of the present invention provides a storage medium having recorded thereon a computer program for executing a method. The method comprises reading at least one of each of RAW data in frames, each of completely developed image data, and each of data of moving quantity, from a storage medium having sequentially per frame recorded thereon the RAW data in frames, with the completely developed image data in frames being obtained by performing an image developing process on the RAW data, and the data of moving quantity in frames used to generate completely electronic hand tremble correction processed image data being obtained by performing an electronic hand tremble correction process on the completely developed image data. The method further comprises performing an image process partially extracting a frame of corresponding RAW data according to the read data of moving quantity when reproducing sequentially the RAW data in frames.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Embodiments of the present invention will now be described more fully with reference to the attached drawings. Like reference numerals in the drawings denote like elements, and thus their description will be omitted.

Figure 1:
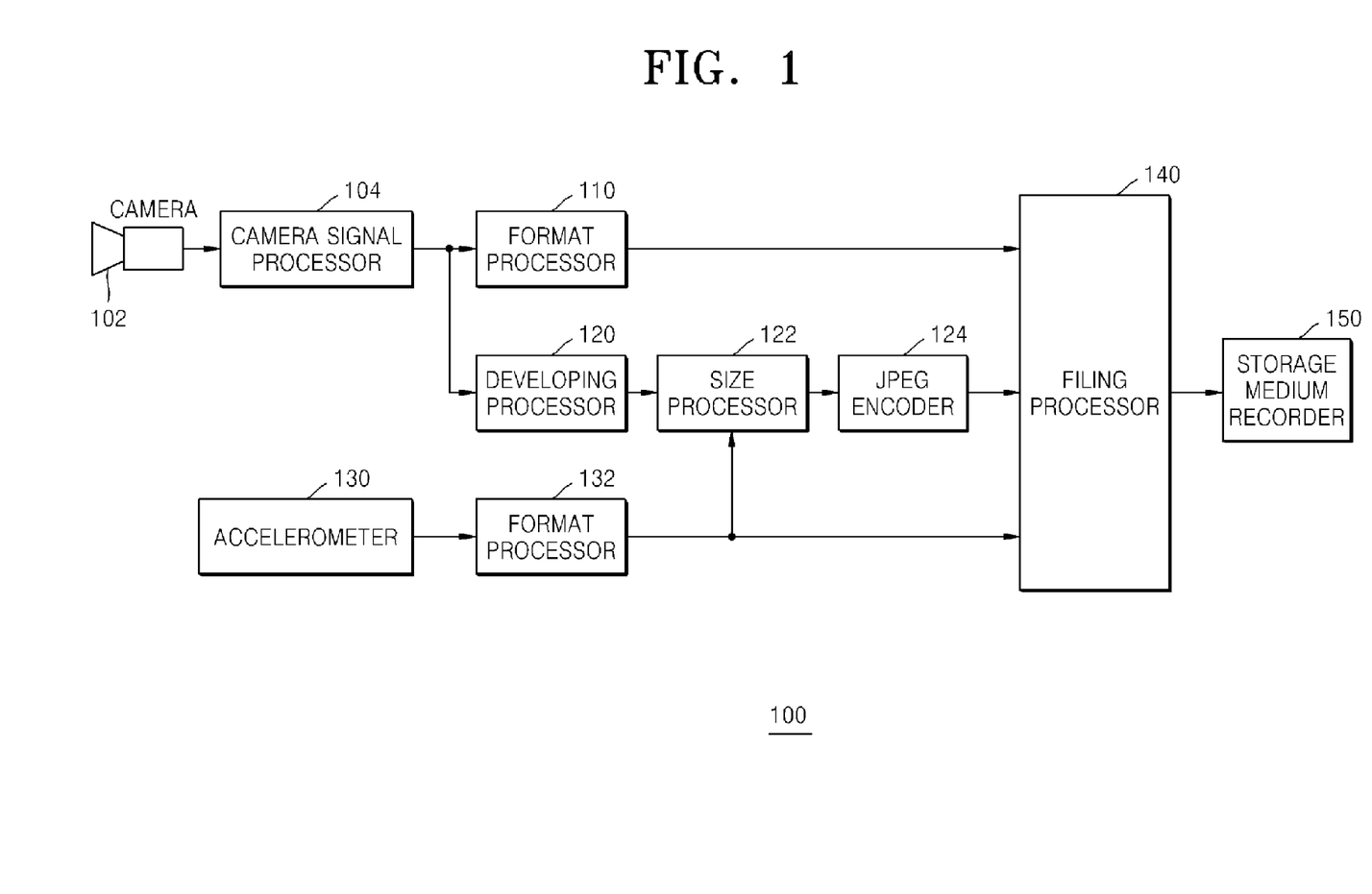
FIG. 1 is a block diagram illustrating an example of a configuration of a motion picture recording apparatus according to an embodiment of the present invention.

FIG. 1, is a block diagram illustrating an example of a motion picture recording apparatus 100 according to an embodiment of the present invention. The motion picture recording apparatus 100 includes a camera 102, a camera signal processor 104, a format processor 110, a developing processor 120, a size processor 122, a joint photographic experts group (JPEG) encoder 124, an accelerometer 130, a format processor 132, a filing processor 140, and a media recorder 150.

Motion picture data per frame output from an image sensor, such as a charge-coupled device (CCD), a complementary metal oxide semiconductor (CMOS), etc., of the camera 102 is input to the camera signal processor 104. The camera signal processor 104 includes an analog-to-digital (AD) converter that converts an input signal from analog to digital. A digital image signal output from the camera signal processor 104 is transmitted to both the format processor 110 and the developing processor 120.

The format processor 110 rearranges digital-converted red (R), green (G), and blue (B) signals according to a pixel arrangement (i.e., Bayer arrangement, triple CCD, etc.). Also, the format processor 110 performs reversible compression on motion picture data in a frame. Reversible compression method enables recording and reproducing image data without degradation in image quality, etc. An example of a reversible compression method is entropy encoding using Huffman codes. Also, the reversible compression method is not limited to "reversibility" in the strict sense. Accordingly, the format processor 110 does not perform compression, whereby image quality is lost, in order to maintain the image quality in raw format. Meanwhile, since the size of raw data is very large, the data will have a less degree of freedom for processes. Motion picture data formatted by the format processor 110 is input to the filing processor 140 as RAW data.

The developing processor 120 performs image signal processes on input image data. The image signal processes include white balance process, data interpolation process according to the Bayer arrangement, noise elimination, brightness and color correction, etc. Data processed by the developing processor 120 is transmitted to the size processor 122.

The size processor 122 performs a process to reduce the size of motion picture data. Here, in case where an electronic hand tremble correction is carried out when an image is captured, the size processor 122 receives data of moving quantity of the image sensor and processes the hand tremble correction (extracts a part of a data region). Data output from the size processor 122 is transmitted to the JPEG encoder 124.

Furthermore, if necessary, the size processor 122 performs the process of reducing the size of motion picture data according to the screen size of display devices, such as an electronic view finder (EVF) (not shown), a liquid crystal display (LCD) (not shown), etc. The size processor 122 is an example of an electronic hand tremble corrector. For example, the size processor 122 calculates moving quantity of an image capturing device of the motion picture recording apparatus 100 when the image capturing device captures an image based on acceleration data output by the accelerometer 130, extracts (determines an extracting location so as to extract data) a partial region of the image data in a frame based on the calculated moving quantity, and moves the extracted region. Thus, the image data is data for the electronic hand tremble correction. Furthermore, although the moving quantity of the image capturing device is calculated in the present embodiment, the present invention is not limited to this arrangement. For example, moving quantity of a lens can be calculated. Data output from the size processor 122 is transmitted to a display device such as an EVF or a LCD and is displayed on the screen of the same. Thus, a user can recognize an image captured by the camera 102 in real time.

The JPEG encoder 124 performs JPEG compression coding process on input data and transmitted compressed image data (processed image data) to the filing processor 140. The accelerometer 130 outputs the acceleration data necessary for the electronic hand tremble correction carried out when motion pictures are photographed. The accelerometer 130 transmits the acceleration data to the format processor 132. The format processor 132 performs a format process on output values of the accelerometer 130, and transmits generated data to the size processor 122 and the filing processor 140.

The filing processor 140 temporarily stores raw data transmitted from the format processor 110, compressed image data compressed in the JPEG encoder 124, or the data of moving quantity transmitted from the format processor 132. The filing processor 140 is an example of a moving quantity data obtaining unit. The raw data transmitted from the format processor 110, the compressed image data compressed in the JPEG encoder 124, and the data of moving quantity transmitted from the format processor 132, stored in the filing processor 140, are transmitted to the media recorder 150 and are recorded to storage media according to a recording format of the storage media. Examples of the storage media include optical recording media (CD, DVDs, etc.), magneto-optical disks, magnetic disks, semiconductor memory devices, etc.

Furthermore, although not shown, the motion picture recording apparatus 100 includes a host CPU. The host CPU controls data transmission from the filing processor 140 to the storage media processor 150 and data recording of the media recorder 150 to storage media. The host CPU transmits the compressed image data, the raw data, and the data of moving quantity, stored in the filing processor 140, to the media recorder 150 per predetermined quantity (i.e. data quantity of one frame) and controls the filing processor 140 and the media recorder 150 such that the transmitted data are sequentially recorded to storage media. The host CPU records the compressed image data, the raw data, and the data of moving quantity to storage media in a predetermined sequence.

Processes in the motion picture recording apparatus 100 can be performed either by hardware or software. In the motion picture recording apparatus 100 according to the present embodiment, digital image data output from the image sensor of the camera 102 and converted from analog to digital is transmitted to the format processor 110, and the raw data is recorded to storage media. Therefore, high-quality raw data is recorded to storage media, and images having higher quality as compared to the compressed image data can be reproduced by reading and displaying the raw data.

Meanwhile, since the size of raw data is very large, images cannot be displayed on a display device, such as an EVF or a LCD, in real time by using the raw data. Furthermore, a compression process, such as JPEG compression, cannot be performed directly on the RAW data. In the motion picture recording apparatus 100 according to the present embodiment, since the image signal process, size reducing process, and compression process are performed together with raw data recording, images can be displayed on a display device, such as an EVF or a LCD, in real time as the images are captured. Thus, a user can capture images while monitoring displayed images. Furthermore, since the compressed image data is recorded to storage media together with the raw data, operations, such as image browsing, thumbnail image displaying, etc., can be performed by using the compressed image data. Therefore, an important part of images can be reproduced with high quality by using the raw data, whereas relatively less important part of images can be reproduced in simplified form by quickly reading the compressed image data.

Furthermore, the motion picture recording apparatus 100 according to the present embodiment stores the raw data intact and files the output values of the accelerometer 130 corresponding to the electronic hand tremble correction or the data of moving quantity of the image capturing device that is calculated from the output values, together with raw data. Since the data of moving quantity is recorded to storage media together with the raw data, a developing process on the raw data is performed by reading the data of moving quantity, and thus high precision hand tremble correction can be carried out. Furthermore, the compressed image data as reference images is electronic hand tremble corrected data. Therefore, operations, such as image browsing, image confirmation, etc., can be performed efficiently by using the compressed image data.

Figure 2:
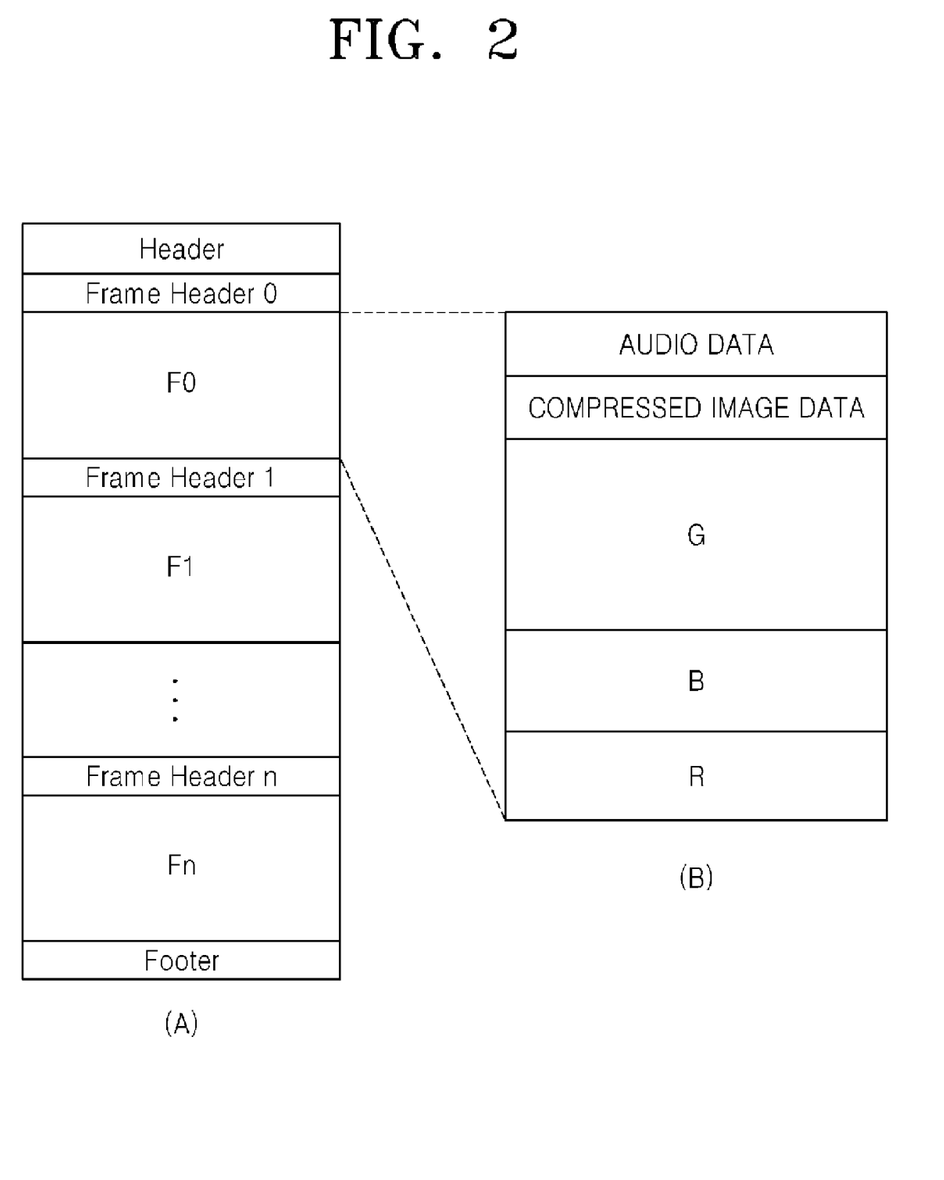
FIGS. 2(A) and 2(B) are schematic diagrams illustrating an example of a recording format in which the motion picture recording apparatus records data to a storage medium.

Next, a recording format of storage media will be described. FIGS. 2(A) and 2(B) are schematic diagrams illustrating examples of a recording format in which the motion picture recording apparatus 100 records data to storage media. For example, if only one Bayer image sensor is used, data is output in a pixel sequence of the Bayer arrangement of R:G:B=1:2:1. To record the data in the Bayer arrangement without loss of image quality, the data is rearranged by the format processor 110 and the rearranged data is recorded to a storage medium without performing a compression process, which degrades image quality, in the motion picture recording apparatus 100.

FIG. 2(A) indicates a single motion picture file between the start of image recording (record start) and the end of image recording (record end). Furthermore, FIG. 2(B) indicates data of one frame in recorded data shown in FIG. 2(A).

RGB data according to the Bayer arrangement is rearranged by the format processor 110 and is recorded to data regions of storage media. Furthermore, the compressed image data encoded by the JPEG encoder 124 and audio data formatted in a format processor (not shown) are also recorded to data regions. As shown in FIG. 2(A), a header is recorded to a first region of a recording format. General data including the date when an image is captured, information on an image sensor of the camera 102, a set name of the motion picture recording apparatus 100, the number of audio channels, the number of bits, information on a recording format of storage media, spec data of a lens of the camera 102, etc., are recorded to the header. After the header, data is recorded per frame of images.

Data per frame includes frame headers Frame Header 0 through Frame Header n and data per frame F0 through Fn. As shown in FIG. 2(B), data per frame are recorded repeatedly per frame in a sequence of audio data Audio, compressed image data Compressed Image, and raw data G, B, and R. Then, a footer is recorded following to data of a final frame Fn.

For example, the sizes of audio data, compressed image data, and raw data of each frame are recorded to a frame header of each of the frames. Furthermore, data of moving quantity for each of the frames are recorded to the frame headers.

Figure 3:
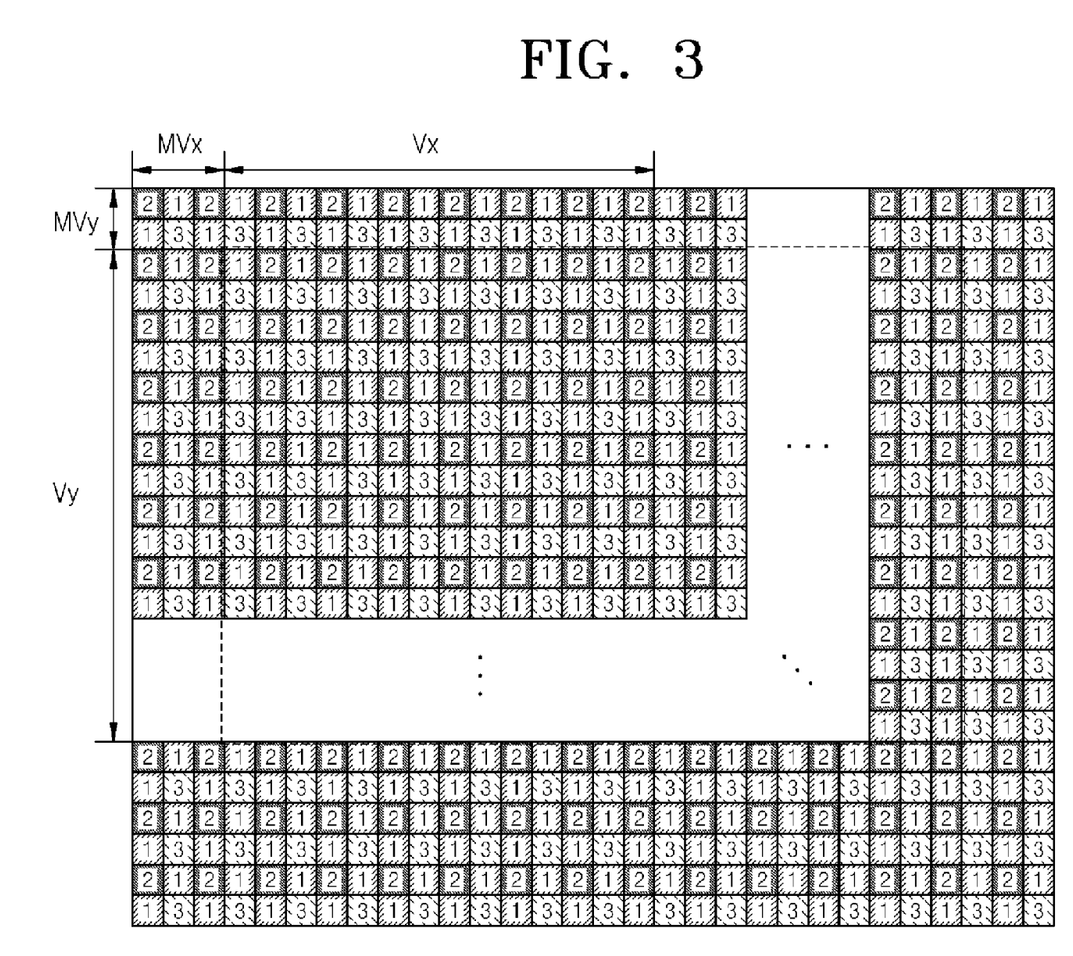
FIG. 3 is a schematic diagram of an example of an image capturing surface of an image sensor according to the embodiment of FIG. 1.

An example of a data extract in an electronic hand tremble correction will be described in reference with FIG. 3. FIG. 3 is a schematic diagram of an example of an image capturing surface of an image sensor according to the present embodiment.

The compressed image data generated by the developing processor 120 and the size processor 122 is data for the electronic hand tremble correction, for example, only data in the Hz×Vz region shown in FIG. 3 is extracted. Meanwhile, for the raw data generated by the format processor 110, entire data from image capturing surface shown in FIG. 3 is recorded. The data of moving quantity can be the output values of the accelerometer 130 that is A/D converted. When the hand tremble correction is carried out, since the output values of the accelerometer 130 varies in a temporal direction, information in a photographing frame is recorded as a plurality of points. A phase difference between compressed image data and raw image data, i.e., a location of the extract data in the electronic hand tremble correction can be recorded when the compressed image data is recorded. The location of the extract data can be, for example, a combination of MVx and MVy shown in FIG. 3. Thus, the location of the extracting data can be reference information when a developing process on the raw image data is performed.

Figure 4:
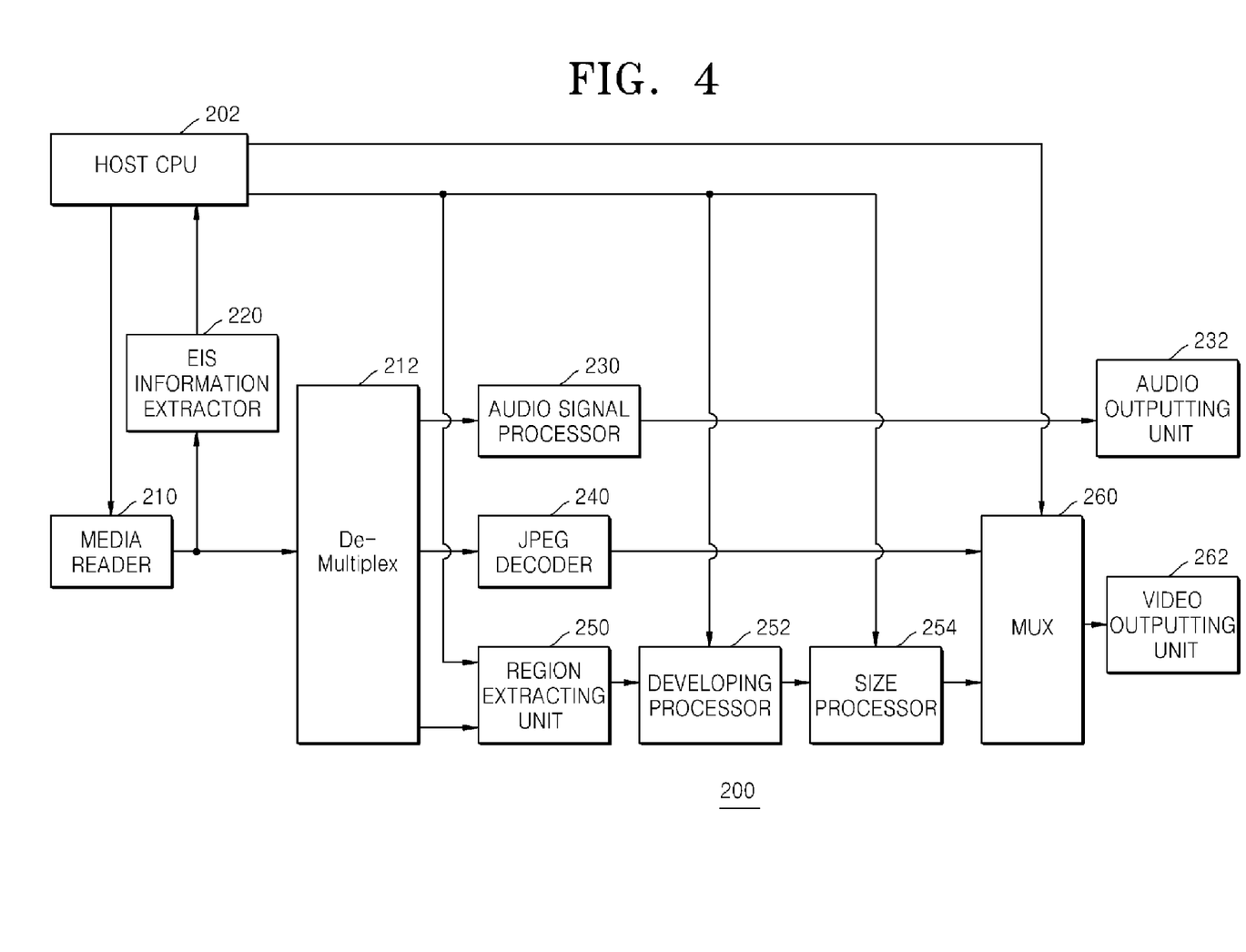
FIG. 4 is a block diagram illustrating an example of a configuration of the motion picture reproduction apparatus according to the embodiment of FIG. 1.

A motion picture reproduction apparatus 200 reproducing motion picture data recorded in the motion picture recording apparatus 100 of FIG. 1 will be described in reference with FIG. 4. FIG. 4 is a block diagram illustrating an example of a configuration of the motion picture reproduction apparatus 200 according to an embodiment of the present invention. As shown in FIG. 4, the motion picture reproduction apparatus 200 includes a host CPU 202, a media reader 210, a de-multiplexer 212, an electronic image stabilization (EIS) information extractor 220, an audio signal processor 230, an audio outputting unit 232, a JPEG decoder 240, a region extracting unit 250, a developing processor 252, a size processor 254, a multiplexer (MUX) 260, and a video outputting unit 262.

The media reader 210 reads data from storage media according to an instruction from the host CPU 202. The de-multiplexer 212 temporarily collects the data read from the storage media reader 210 and transmits the collected data to the audio signal processor 230, the JPEG decoder 240, and the region extracting unit 250. The EIS information extractor 220 extracts data of moving quantity recorded in a frame header and transmits the data of moving quantity to the host CPU 202.

The host CPU 202 controls an image process performed in the developing processor 252 or the size processor 254 according to the data of the moving quantity transmitted from the EIS information extractor 220. In case where the data of moving quantity is read out from the storage media, developing process and sizing process are performed according to the data of the moving quantity. Thus, in response to the electronic hand tremble correction when an image is photographed, high precision hand tremble correction can be carried out.

The audio signal processor 230 deformats audio data, converts the deformatted signals from digital to analog, and transmits the converted signals to the audio outputting unit 232. The audio outputting unit 232 outputs the analog-converted audio signals. Furthermore, the JPEG decoder 240 decodes compressed image data, reduces or magnifies the decoded image data, and transmits the image data either reduced or magnified to the multiplexer 260.

The region extracting unit 250 performs Bayer de-formatting on raw data, rearranges the raw data in the Bayer arrangement, and transmits the rearranged raw data to the developing processor 252. The region extracting unit 250 calculates the quantity of extracted data used for a hand tremble correction process based on the data of the moving quantity transmitted from the EIS information extracting unit 220 through the host CPU 202.

With respect to the deformatted raw data, the developing processor 252 performs predetermined image developing processes, such as white balance process, data interpolation process according to the Bayer arrangement, noise elimination, brightness and color correction, etc. The size processor 254 performs a process of reducing the size of raw data to which the image developing process is performed and transmits the reduced raw data to the MUX 260.

The MUX 260 transmits image data, transmitted from the JPEG decoder 240 or the size processor 254, to the video outputting unit 262. The video outputting unit 262 converts the transmitted data from digital to analog and displays the analog-converted signal data.

Furthermore, processes in the motion picture reproduction apparatus 200 can be performed either by hardware or software. In the motion picture reproduction apparatus 200 according to the present embodiment, the developing process and sizing process are performed by using the data of moving quantity recorded in each of frame headers of a file read out by the storage media reader 210. Furthermore, according to the motion picture reproduction apparatus 200 according to the present embodiment, the developing process on raw data can be performed by software, and thus high-end algorithms can be used. As a result, a high performance operation of moving quantity or a hand tremble operation using an image itself can be performed, and thus high precision hand tremble correction can be carried out.

In case where raw data is reproduced, each of the raw data including G, B, and R are read from storage media. The raw data becomes image signals by performing an image developing process on the read data. The signals are reduced to a predetermined image size and are output from the video outputting unit 262. Thus, high quality images can be reproduced by the motion picture reproduction apparatus 200.

In case where compressed image data is reproduced, the compressed image data can be reproduced by sequentially reading compressed image data from storage media per frame. In this case, the size of read-out data is significantly smaller than that of raw data. By reducing or magnifying JPEG-decoded image signals into a predetermined image size and outputting the image signals either reduced or magnified, compressed image data can be reproduced with processes inflicting less load as compared to raw data reproduction. Accordingly, by using simplified reproduction mode using compressed image data, the hardware configuration of the motion picture reproduction apparatus 200 can be significantly simplified. Furthermore, power consumption can be significantly lowered.

Also, in a high-speed reproduction mode, which is a special reproduction mode, a low-load process can be performed by using JPEG data. In this case, only frame headers can be browsed in accordance with a reproduction speed rate, read compressed image data by performing interlaced scan on only required frames from data size information of audio data, compressed image data, and RAW data, JPEG decode the compressed image data, and read the decoded data. The method can also be used in reverse reproduction.

Furthermore, it is also possible to show an index of captured images in a file as thumbnail images by using compressed image data. In this case, with respect to each of a plurality of motion picture files, either one frame images or the motion picture file can be shown as either thumbnail images or motion picture thumbnail images.

As described hitherto, both raw data and compressed image data can be recorded by relating them to each other according to this embodiment. Therefore, raw data is used for high quality reproduction, whereas compressed image data is used for real time display, image browsing, etc. Thus, the motion picture recording apparatus 100 and the motion picture reproduction apparatus 200 providing high image quality and excellent control-base interaction can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A motion picture recording apparatus comprising:
    an image developing processor which performs an image developing process on raw data sequentially output from an image sensor in frames and generating completely developed image data in frames;
    a moving quantity data obtaining unit which obtains data of moving quantity during capturing of the frames by the image sensor;
    an electronic hand tremble correction unit which reduces an image size of the completely developed image data by extracting a partial region of the completely developed image data, performs an electronic hand tremble correction process on the completely developed image data by repositioning the partial region based on the moving quantity data, and generates a completely electronic hand tremble correction processed size-reduced image data; and
    a storage medium recorder which sequentially records the raw data in frames, the completely electronic hand tremble correction processed size-reduced image data in frames, and the data of moving quantity in frames to a storage medium per frame.

2. A motion picture recording apparatus as claimed in claim 1, further comprising:
    an accelerometer which outputs acceleration data based on which the electronic hand tremble correction unit performs the electronic hand tremble correction process.

3. A motion picture recording apparatus as claimed in claim 1, further comprising:
    an encoder which encodes the completely electronic hand tremble correction processed size-reduced image data before the storage medium recorder records the encoded completely electronic hand tremble correction processed size-reduced image data to the storage medium.

4. A motion picture reproduction apparatus comprising:
    a data reader which reads of each of raw data in frames, each of completely electronic hand tremble correction processed size-reduced image data, and each of data of moving quantity, from a storage medium having sequentially per frame recorded thereon the RAW data is frames, the completely electronic hand tremble correction processed size-reduced image data in frames being obtained by performing an image developing process on the raw data to generate a completely developed image data, reducing an image size of the completely developed image data by extracting a partial region of the completely developed image data, and performing an electronic hand tremble corrections process by repositioning the partial region, and the data of moving quantity in frames used to generate the completely electronic hand tremble correction processed size-reduced image data when performing the electronic hand tremble correction process; and
    an image processor which performs an image process partially extracting a frame of corresponding raw data according to the read data of moving quantity when reproducing sequentially the raw data in frames.

5. A motion picture reproduction apparatus as claimed in claim 4, wherein:
    the data reader further reads audio data from the storage medium; and
    wherein:
    the reproduction apparatus further comprises an audio signal processor which deformats the read audio data.

6. A motion picture reproduction apparatus as claimed in claim 4, further comprising:
    at least one of a developing processor and a sizing processor which perform the electronic hand tremble correction process.

7. A motion picture recording method comprising:
    performing an image developing process on raw data sequentially output from an image sensor in frames and generating completely developed image data in frames;
    obtaining data of moving quantity in frames during capturing of the frames by the image sensor;
    performing an electronic hand tremble correction process on the completely developed image data based on the moving quantity by reducing an image size of the completely developed image data to extract a partial region of the completely developed image data and repositioning the partial region based on the moving quantity and generating completely electronic hand tremble correction processed size-reduced image data; and
    sequentially recording the raw data in frames, the completely electronic hand tremble correction processed size-reduced image data in frames, and the data of moving quantity in frames to a storage medium per frame.

8. A motion picture recording method as claimed in claim 7, further comprising:
    outputting acceleration data based on which the electronic hand tremble correction process is performed.

9. A motion picture recording method as claimed in claim 7, further comprising:
    encoding the completely electronic hand tremble correction processed size-reduced image data before the storage medium recorder records the encoded completely electronic hand tremble corrections processed size-reduced image data to the storage medium.

10. A motion picture reproduction method comprising:
    reading each of RAW data in frames, each of completely electronic hand tremble correction processed size-reduced image data, and each of data of moving quantity, from a storage medium having sequentially per frame recorded thereon the raw data in frames, the completely electronic hand tremble correction processed size-reduced image data in frames obtained by performing an image developing process on the raw data to generate a completely developed image data, reducing an image size of the completely image data by extracting a partial region of the completely developed image data, and performing an electronic hand tremble correction process by repositioning the partial region, and the data of moving quantity in frames used to generate the completely electronic hand tremble correction process; and
    performing an image process partially extracting a frame of corresponding raw data according to the read data of moving quantity when reproducing sequentially the raw data in frames.

11. A motion picture reproduction method as claimed in claim 10, wherein:
    the reading step further reads audio data from the storage medium; and wherein:
the reproduction method further comprises deformatting the read audio data.

12. A motion picture reproduction method as claimed in claim 10, wherein:
the electronic hand tremble correction process includes performing at least one of developing processing and sizing processing on the completely developed image data.

13. A non-transitory storage medium having recorded thereon a computer program for performing a motion picture recording method when executed by a computer, the method comprising:
performing an image developing process on raw data sequentially output from an image sensor in frames and generating completely developed image data in frames;
obtaining data of moving quantity in frames during capturing of the frames by the image sensor;
performing an electronic hand tremble correction process on the completely developed image data based on the moving quantity by reducing an image size of the completely developed image data to extract a partial region of the completely developed image data and repositioning the partial region based on the moving quantity and generating completely electronic hand tremble correction processed size-reduced image data; and
sequentially recording the raw data in frames, the completely electronic hand tremble correction processed size-reduced image data in frames, and the data of moving quantity in frames to a storage medium per frame.

14. A non-transitory storage medium as claimed in claim 13, wherein the method further comprises:
outputting acceleration data based on which the electronic hand tremble correction process is performed.

15. A non-transitory storage medium as claimed in claim 13, wherein the method further comprises:
encoding the completely developed image data before the storage medium recorder records the completely developed image data to the storage medium.

16. A non-transitory storage medium having recorded thereon a computer program for performing a motion picture reproduction method when executed by a computer, the method comprising:
reading each of raw data in frames, each of completely electronic hand tremble correction processed size-reduced image data, and each of data of moving quantity, from a storage medium having sequentially per frame recorded thereon the raw data in frames, raw data in frames, the completely electronic hand tremble correction processed size-reduced image data in frames obtained by performing an image developing process on the raw data to generate a completely developed image data, reducing an image size of the completely developed image data by extracting a partial region of the completely developed image data, and performing an electronic hand tremble correction process by repositioning the partial region, and the data of moving quantity in frames used to generate the completely electronic hand tremble correction processed size-reduced image data when performing the electronic hand tremble correction process
performing an image process partially extracting a frame of corresponding raw data according to the read data of moving quantity when reproducing sequentially the raw data in frames.

17. A non-transitory storage medium as claimed in claim 16, wherein:
the reading step further reads audio data from the storage medium; and
wherein:
the method further comprises deformatting the read audio data.

18. A non-transitory storage medium as claimed in claim 16, wherein:
the electronic hand tremble correction process includes performing at least one of developing processing and sizing processing on the completely developed image data.

* * * * *

UNITED STATES PATENT AND TRADEMARK OFFICE
CERTIFICATE OF CORRECTION

PATENT NO. : 8,379,093 B2
APPLICATION NO. : 12/329801
DATED : February 19, 2013
INVENTOR(S) : Mineki Taoka It is certified that error appears in the above-identified patent and that said Letters Patent is hereby corrected as shown below:

IN THE CLAIMS:

In Claim 4, Column 9, line 48, replace "a data reader which reads of each of raw data in frames" with -- a data reader which reads each of raw data in frames --

In Claim 4, Column 9, lines 52-53, replace "the RAW data is frames" with -- the RAW data in frames --

In Claim 10, Column 10, line 54, replace "the completely image data" with -- the completely developed image data --

In Claim 10, Column 9, line 59, replace "hand tremble correction process" with -- hand tremble correction processed size-reduced image data when performing the electronic hand tremble correction process --

In Claim 16, Column 12, lines 9-10, delete second occurrence of "raw data in frames"

In Claim 16, Column 12, lines 21-22, replace "hand tremble correction process" with -- hand tremble correction process; and --

Signed and Sealed this
Thirteenth Day of August, 2013

Teresa Stanek Rea
*Acting Director of the United States Patent and Trademark Office*